US012693395B2

(12) United States Patent (10) Patent No.: US 12,693,395 B2

Barber et al. (45) Date of Patent: Jul. 28, 2026

(54) COHERENT SIGNAL COMBINING WITH MULTIPLE-OUTPUTS FOR QUASI-CW LIDAR OPERATION

(71) Applicant: Aurora Operations, Inc., Pittsburgh, PA (US)

(72) Inventors: Zeb Barber, Pittsburgh, PA (US); Randy R. Reibel, Pittsburgh, PA (US); Emil Kadlec, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 106 days.

(21) Appl. No.: 18/669,875

(22) Filed: May 21, 2024

(65) Prior Publication Data

US 2024/0302509 A1 Sep. 12, 2024

Related U.S. Application Data

(63) Continuation of application No. 17/530,328, filed on Nov. 18, 2021, now Pat. No. 11,994,629, which is a (Continued)

(51) Int. Cl.
*G01S 7/4912* (2020.01)
*G01S 17/931* (2020.01)

(52) U.S. Cl.
CPC .......... *G01S 7/4917* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 6,366,382 B1 | 4/2002 | Morthier et al. | |
| 6,522,462 B2 | 2/2003 | Chu et al. | |
| | (Continued) | | |

FOREIGN PATENT DOCUMENTS

| | | |
|---|---|---|
| CN | 110138455 A | 8/2019 |
| JP | 2018-200273 A | 12/2018 |
| | (Continued) | |

OTHER PUBLICATIONS

Canadian Office Action issued in connection with CA Appl. Ser. No. 3170636 dated May 15, 2023.

(Continued)

*Primary Examiner* — James J Lee
*Assistant Examiner* — Melanie G Huber
(74) *Attorney, Agent, or Firm* — Dority & Manning, P.A.

(57) ABSTRACT

A light detection and ranging (LIDAR) system may include a laser configured to output a beam, an amplifier and a plurality of splitters. The amplifier may generate, based on the beam, a plurality of amplified optical signals that are respectively associated with a plurality of phases. The plurality of splitters, coupled between the amplifier and a plurality of outputs, may receive the plurality of amplified optical signals, generate, at a first point of time, a first combined optical signal of the plurality of amplified optical signals at a first output of the plurality of outputs with no optical signal at remaining outputs of the plurality of outputs, and generate, at a second point of time, a second combined optical signal of the plurality of amplified optical signals at a second output of the plurality of outputs with no optical signal at remaining outputs of the plurality of outputs.

20 Claims, 11 Drawing Sheets

Related U.S. Application Data continuation of application No. 17/142,868, filed on Jan. 6, 2021, now Pat. No. 11,209,529.

(60) Provisional application No. 62/993,436, filed on Mar. 23, 2020, provisional application No. 62/985,724, filed on Mar. 5, 2020.

(56) References Cited

U.S. PATENT DOCUMENTS

| | | | |
|---|---|---|---|
| 7,502,395 B2 | 3/2009 | Cheng et al. | |
| 7,936,448 B2 | 5/2011 | Albuquerque et al. | |
| 8,659,748 B2 | 2/2014 | Dakin et al. | |
| 8,786,942 B2 | 7/2014 | Palese et al. | |
| 9,503,196 B2 | 11/2016 | Galvanauskas | |
| 10,678,117 B2 | 6/2020 | Shin et al. | |
| 10,802,120 B1 * | 10/2020 | LaChapelle | G01S 7/4865 |
| 11,668,803 B1 * | 6/2023 | Sampson | G01S 7/4861 |
| | | | 356/5.01 |
| 2003/0002797 A1 | 1/2003 | Chu et al. | |
| 2008/0013954 A1 | 1/2008 | Boduch et al. | |
| 2008/0037028 A1 | 2/2008 | Cheung et al. | |
| 2011/0216794 A1 * | 9/2011 | Howard | H01S 5/4012 |
| | | | 372/38.01 |
| 2013/0044309 A1 | 2/2013 | Dakin et al. | |
| 2014/0268314 A1 | 9/2014 | Dueck | |
| 2017/0299697 A1 | 10/2017 | Swanson | |
| 2018/0052378 A1 * | 2/2018 | Shin | G02F 1/292 |
| 2018/0100929 A1 * | 4/2018 | O'Keeffe | G01S 17/931 |
| 2019/0004394 A1 * | 1/2019 | Shin | G02F 1/3137 |
| 2019/0129008 A1 | 5/2019 | Lin et al. | |
| 2019/0250254 A1 | 8/2019 | Campbell et al. | |
| 2019/0265574 A1 | 8/2019 | Skirlo et al. | |
| 2020/0195327 A1 | 6/2020 | Thiagarajan et al. | |
| 2020/0350737 A1 | 11/2020 | Beresnev et al. | |

FOREIGN PATENT DOCUMENTS

| | | |
|---|---|---|
| JP | 2023-507679 A | 2/2023 |
| WO | WO-2018/107237 A1 | 6/2018 |
| WO | WO-2019/209727 | 10/2019 |
| WO | WO 2019220513 A1 | 11/2019 |
| WO | WO-2020/033161 A1 | 2/2020 |

OTHER PUBLICATIONS

European Search Report issued in connection with EP Appl. No. 21765013.4 dated Mar. 12, 2024.

Final Office Action on U.S. Appl. No. 17/530,328 DTD Sep. 26, 2023.

Final Office Action on U.S. Appl. No. 17/142,868 dated Jun. 8, 2021 (19 pages).

Foreign Action other than Search Report on CA DTD Dec. 14, 2022.

Foreign Action other than Search Report on CN DTD Jan. 19, 2023.

Foreign Action other than Search Report on PCT DTD Sep. 15, 2022.

International Search Report and Written Opinion on Appl. Ser. No. PCT/US2021/020660 dated May 6, 2021 (10 pages).

Japanese Office Action issued in connection with JP Appl. Ser. No. 2022-553116 dated Mar. 7, 2023 (9 pages).

Korean Office Action issued in connection with KR Appl. Ser. No. 10-2023-7004701 dated Jun. 16, 2023.

Non-Final Office Action on U.S. Appl. No. 17/530,328 DTD Apr. 17, 2023.

Non-Final Office Action on U.S. Appl. No. 17/142,868 dated Mar. 10, 2021 (24 pages).

Notice of Allowance on U.S. Appl. No. 17/530,328 DTD Jan. 24, 2024.

Notice of Allowance on U.S. Appl. No. 17/142,868 dated Aug. 26, 2021 (6 pages).

Oermann, M et al., "Coherent Beam Combination of Four Holmium Amplifiers With Phase Control Via A Direct Digital Synthesizer Chip", Optical Express, vol. 26, Issue 6, pp. 6715-6723, Mar. 19, 2018.

Office Action issued in connection with Canada Appl. No. 3170636 dated Sep. 28, 2023.

Office Action issued in connection with Korean Appl. No. 10-2023-7004701 dated Dec. 6, 2023.

Office Action issued in connection with Japanese Appl. No. 2023-099569 dated Jun. 11, 2024.

Oermann et al. "Coherent beam combination of four holmium amplifiers with phase control via a direct digital synthesizer chip." Optics Express 6715, vol. 26, No. 6. Dated Mar. 19, 2018. 9 pgs.

* cited by examiner

1

COHERENT SIGNAL COMBINING WITH MULTIPLE-OUTPUTS FOR QUASI-CW LIDAR OPERATION

CROSS-REFERENCE TO RELATED APPLICATIONS

This application is a continuation of U.S. patent application Ser. No. 17/530,328, filed Nov. 18, 2021, which claims the benefit of and priority to U.S. patent application Ser. No. 17/142,868, filed Jan. 6, 2021, which claims the benefit of and priority to U.S. Provisional Patent Application No. 62/985,724, filed Mar. 5, 2020 and U.S. Provisional Patent Application No. 62/993,436, filed Mar. 23, 2020. The entire disclosure of U.S. patent application Ser. No. 17/530,328, U.S. patent application Ser. No. 17/142,868, U.S. Provisional Patent Application No. 62/985,724 and U.S. Provisional Patent Application No. 62/993,436 are incorporated herein by reference in its entirety.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and methods for coherent beam combining with multiple-outputs for quasi-CW LIDAR operation, to support the operation of a vehicle.

In a first set of implementations, a light detection and ranging (LIDAR) system includes a laser configured to output a beam, an amplifier, and an optical network. The amplifier may be configured to receive a plurality of optical signals that are generated based on the beam and are respectively associated with a plurality of phases. The amplifier may be configured to generate a plurality of amplified optical signals based on the plurality of optical signals. The optical network may be coupled to the amplifier. The optical network may be configured to receive the plurality of amplified optical signals. The optical network may be configured to generate an optical signal based on the plurality of amplified optical signals. An amplitude of the optical signal may correspond to a combined amplitude of the plurality of amplified optical signals.

In a second set of implementations, an autonomous vehicle control system includes one or more processors. The one or more processors may be configured to cause a laser to output a beam. The one or more processors may be configured to cause an amplifier to receive a plurality of optical signals that are generated based on the beam and are respectively associated with a plurality of phases. The one or more processors may be configured to cause the amplifier to generate a plurality of amplified optical signals based on the plurality of optical signals. The one or more processors may be configured to cause an optical network to receive the plurality of amplified optical signals. The one or more processors may be configured to cause the optical network to generate an optical signal based on the plurality of amplified optical signals. The optical network may be coupled to the amplifier, and an amplitude of the optical signal may correspond to a combined amplitude of the plurality of amplified optical signals. The one or more processors may be configured to operate a vehicle based on the optical signal.

In a third set of implementations, an autonomous vehicle includes a light detection and ranging (LIDAR) system, at least one of a steering system or a braking system, and a vehicle controller. The LIDAR system may include a laser, an amplifier and an optical network. The laser may be configured to output a beam. The amplifier may be configured to receive a plurality of optical signals that are generated based on the beam and are respectively associated with a plurality of phases. The amplifier may be configured to generate a plurality of amplified optical signals based on the plurality of optical signals. The optical network may be coupled to the amplifier. The optical network may be configured to receive the plurality of amplified optical signals. The optical network may be configured to generate an optical signal based on the plurality of amplified optical signals. An amplitude of the optical signal may correspond to a combined amplitude of the plurality of amplified optical signals. The vehicle controller may include one or more processors configured to control operation of the at least one of the steering system or the braking system based on the optical signal.

BRIEF DESCRIPTION OF THE FIGURES

Implementations are illustrated by way of example, and not by way of limitation, in the figures of the accompanying drawings in which like reference numerals refer to similar elements and in which.

DETAILED DESCRIPTION

A LIDAR system may include a laser source for providing a light signal (sometimes referred to as, "beam"), one or more modulators for modulating a phase and/or a frequency of the light signal using Continuous Wave (CW) modulation or quasi-CW modulation, an amplifier for amplifying the modulated signal to send the signal up to a certain range, and/or optics (e.g., a mirror scanner) for steering the amplified signal to an environment within a given field of view.

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

Figure 2A:
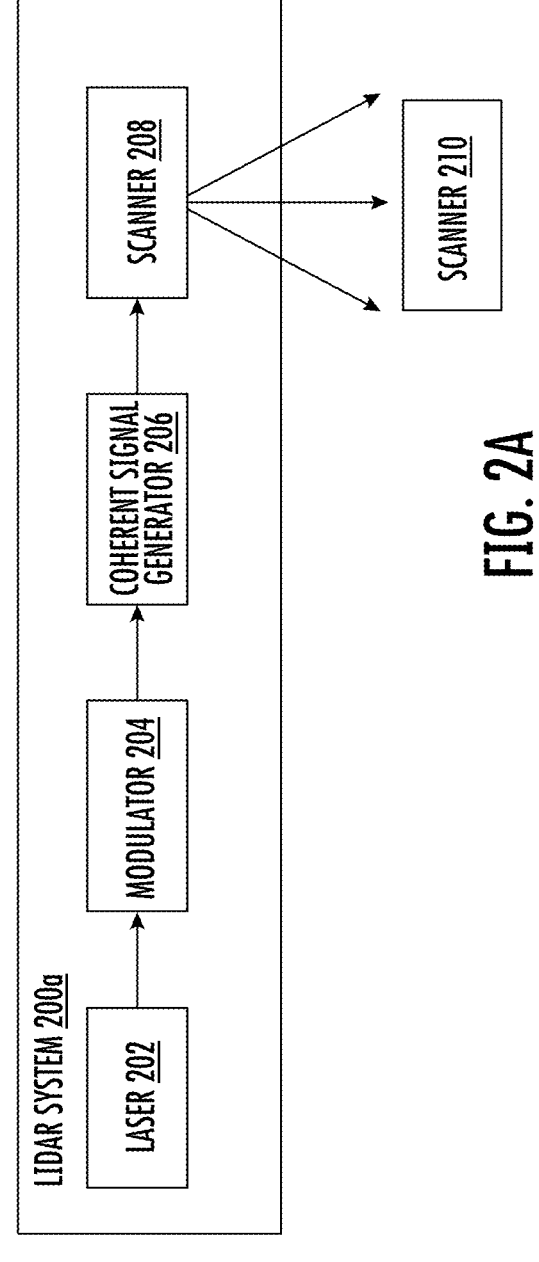
FIG. 2A is a block diagram depicting an example quasi-CW LIDAR system for operating of a vehicle, according to some implementations.
Figure 2B:
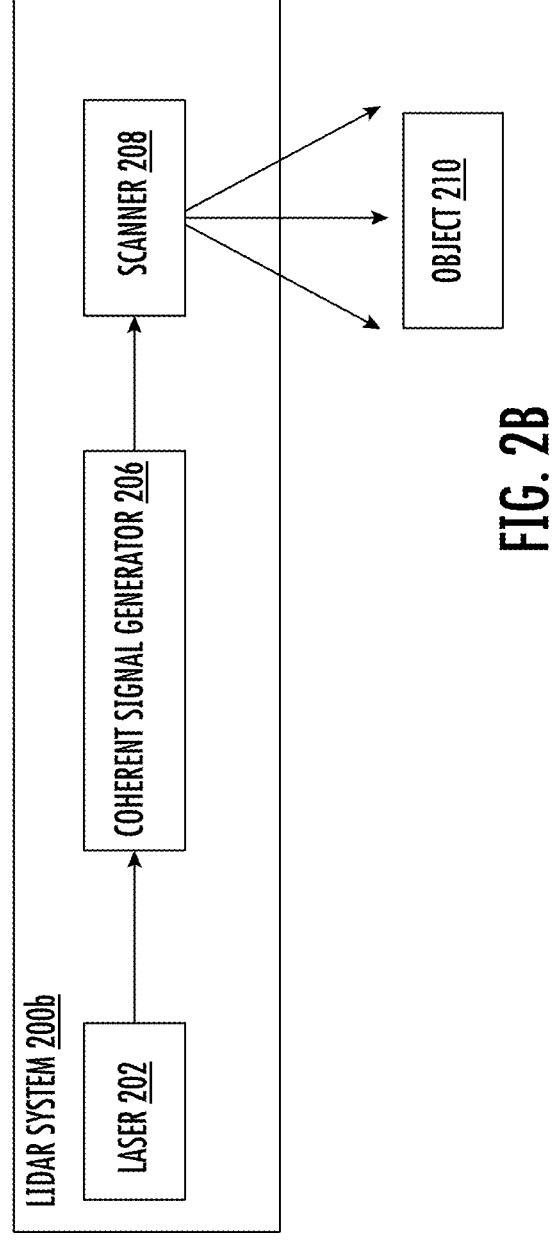
FIG. 2B is a block diagram depicting an example quasi-CW LIDAR system for operating of a vehicle, according to some implementations.

In some implementations, an erbium-doped fiber amplifier (EDFA) may be used to implement a coherent signal generator (e.g., coherent signal generator 206 in FIG. 2A, coherent signal generator 206 in FIG. 2B). By using an EDFA for the coherent beam generator, for a system implementing quasi-CW modulation as the optical gain and/or energy can be stored and output signals from the EDFA can be provided in shorter bursts just by pulsing the input to the EDFA.

In some implementations, semiconductor optical amplifiers (SOAs) can be used to implement a coherent signal generator (e.g., coherent signal generator 206 in FIG. 2A, coherent signal generator 206 in FIG. 2B). By using SOAs for the coherent signal generator, a high level of integration may be achieved. For example, a large number of SOA's can be scaled-down and placed onto a single semiconductor chip, which may result in improvements in not only speed (e.g., less latency) and power consumption (e.g., the power may be more efficiently routed between the SOAs), but also improvements in the manufacturing process. That is, scaling down the coherent signal generator (sometimes referred to as, "signal processing system") onto a single semiconductor chip means that the semiconductor chip (e.g., silicon) may be smaller in size, thereby decreasing the likelihood of a manufacturing defect affecting the performance of the coherent signal generator.

Accordingly, the present disclosure is directed to systems and methods for coherent signal generating (e.g., combining, merging, adding, mixing, etc.) with multiple-outputs for quasi-CW LIDAR operation, to support the operation of a LIDAR system for a vehicle.

In various example implementations, as described in the below passages, a coherent signal generator may include one or more phase shifters, and/or one or more splitters (e.g., 50/50 splitters). The coherent signal generator may include an amplifier containing multiple sub-amplifiers, such as SOAs, that are each coupled to one or more output channels of the coherent signal generator via one or more beam splitters (e.g., a 50/50 beam splitter, etc.). Each sub-amplifier may provide a continuous wave (e.g., up to 95% duty cycle) having a fixed output power. The coherent signal generator may coherently combine (using the one or more splitters) the output powers of some or all of the sub-amplifiers into a combined output power, and send the combined output power to one of the output channels. For example, if the coherent signal generator includes 8 sub-amplifiers that each produce 100 milliwatts (mW) of output power, then the coherent signal generator would combine the output power from the 8 sub-amplifiers to generate a combined output power of 800 mW, and send the combined output power to one of the output channels.

The power combining may be controlled by specific settings of the optical phase relationships among all the sub-amplifiers. The phases may be set (e.g., configured, programmed, initialized, etc.) to provide a combined output power from all the sub-amplifiers in the coherent signal generator to one output channel (e.g., 800 mW of output power that is generated/combined from 8 sub-amplifiers that each produce 100 mW), a combined output power from some of the sub-amplifiers in the coherent signal generator to one output channel (e.g., 200 mW of output power that is generated/combined from 2 of the 8 sub-amplifiers in the coherent signal generator that each produce 100 mW), or any combination in-between. The phases may be set to provide the output power (e.g., 100 mW) of any of the sub-amplifiers to any of the output channels.

As the phase settings can be changed rapidly, in some implementations, the architecture of the CNC network allows the full combined output power (e.g., 800 mW in an 8 sub-amplifier network) from all the sub-amplifiers to be sent to each of the output channels (e.g., 8 channels) sequentially, thereby producing a series of pulses in time provided from each output channel. In some implementations, the total average power provided from all the output channels of the coherent signal generator remains constant, but the distribution of power among the output channels may vary in time.

Various example implementations described herein may include one or more of the following features: (1) some or all paths (from input to output) of the coherent signal generator may be length-matched to ensure stable operation over temperature; (2) the output powers of some or all of the sub-amplifiers of the one or more splitters may be close to identical to get high contrast on one or more output channels of the coherent signal generator; (3) the one or more splitters may have a low-loss and/or very close to a 50/50 split ratio; (4) the coherent signal generator may include one or more waveguide crossings, where the coupling to the wrong path is minimized; the coherent signal generator may include one or more slow static phase shifters on half the branches of each layer to maintain stable operation; (5) the coherent signal generator may include a tap photodiode on the output channels and/or selected points along the branches of the one or more splitters for development purposes and/or to ensure stable operation; (6) the coherent signal generator may include a tap from a laser source before the one or more modulators for coherent detection; (7) the coherent signal generator may include one or more phase shifters before the one or more sub-amplifiers; (8) the coherent signal generator may include one or more phase shifters after the one or more sub-amplifiers; and (9) the coherent signal generator may include one or more phase shifters after the one or more sub-amplifiers that are fast enough to implement the switching efficiently and rapidly (e.g., rise time less than 100 ns), to produce the benefit of losses being compensated by the sub-amplifier gain.

The one or more splitters, in some implementations, may be replaced with a multi-mode interference (MMI) structure or coupler. A binary switch network, in some implementations, after the one or more splitters (or the MIM structure or coupler) may be used to split the outputs to even more output channels.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

1. System Environment for Autonomous Vehicles

Figure 1:
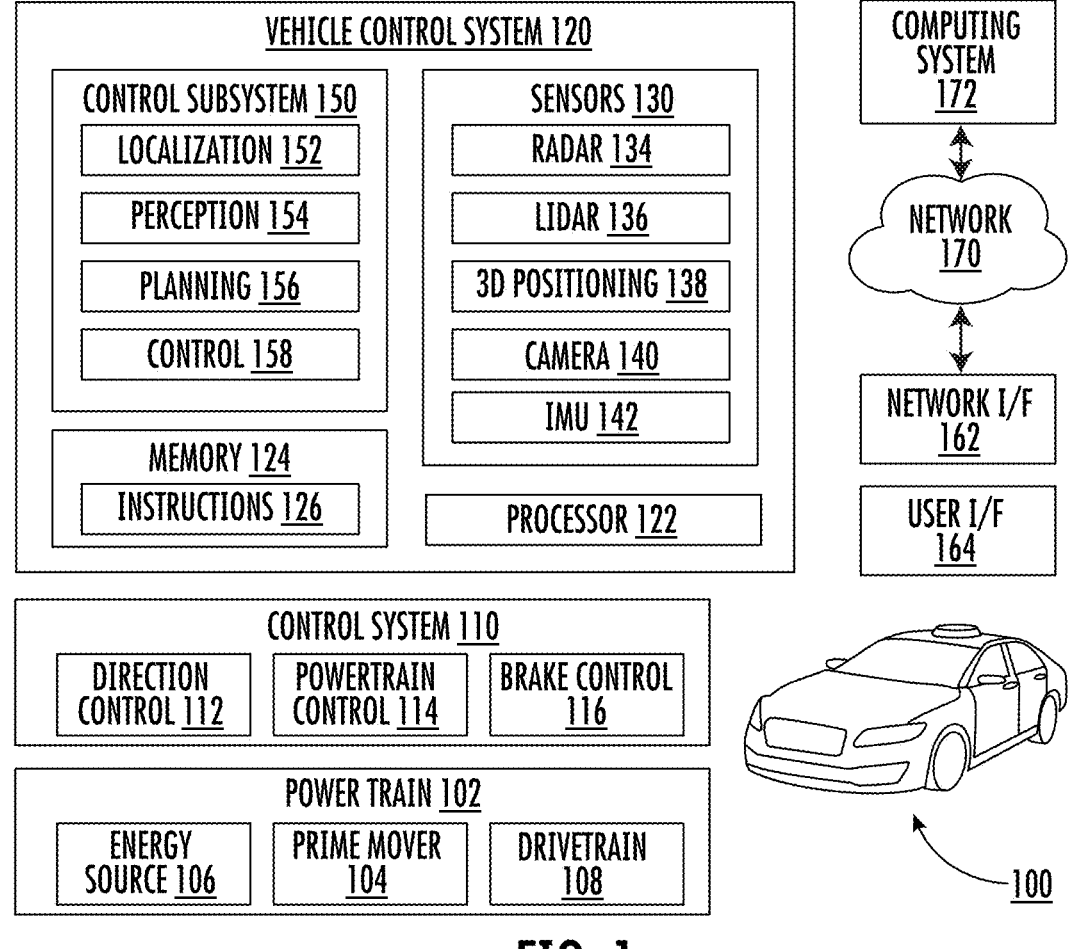
FIG. 1 is a block diagram illustrating an example of a system environment for autonomous vehicles according to some implementations.

FIG. 1 is a block diagram illustrating an example of a system environment for autonomous vehicles according to some implementations.

Referring to FIG. 1, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 100 can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

It will be appreciated that the collection of components illustrated in FIG. 1 for the vehicle control system 120 is merely exemplary in nature. Individual sensors may be omitted in some implementations. Additionally or alternatively, in some implementations, multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1 is not intended to limit implementations disclosed herein. Indeed, other alternative hardware and/or software environments may be used without departing from the scope of implementations disclosed herein.

2. Coherent Signal Combining with Multiple-Outputs

FIG. 2A is a block diagram depicting an example quasi-CW LIDAR system for operating of a vehicle, according to some implementations. The quasi-CW LIDAR system 200a includes a laser source 202 for providing a light signal (sometimes referred to as, "beam").

The quasi-CW LIDAR system 200a includes a modulator 204 for modulating the light signal and a coherent signal generator 206 (sometimes referred to as, "signal processing system") for coherent signal generating (e.g., combining, merging, adding, mixing, etc.) with multiple-outputs for quasi-CW LIDAR operation. That is, the modulator 204 receives the light signal from the laser source 202, modulates a phase and/or a frequency of the light signal using Continuous Wave (CW) modulation or quasi-CW modulation, and provides the modulated signal to one or more input channels of the coherent signal generator 206.

The coherent signal generator 206 combines the received modulated signals to generate a continuous wave signal across the plurality of outputs (e.g., output channels 312a-312d in FIG. 3) of the coherent signal generator 206, and provide the continuous wave signal to a scanner 208 (e.g., an oscillatory scanner, a unidirectional scanner, a Risley prism, etc.). In some implementations, the coherent signal generator 206 generates the continuous wave signal by operating a plurality of sub-amplifiers (e.g., SOAs 308a-d in FIG. 3) on different duty cycles.

Based on the received continuous signal, the scanner 208 generates one or more scanning signals to drive one or more optical elements for the optical detection of an object 210.

As shown in FIG. 2A, the modulator 204 may be separate from the coherent signal generator 206.

Any of the components (e.g., laser source 202, modulator 204, coherent signal generator 206, and scanner 208) of the quasi-CW LIDAR system 200a may be included in one or more semiconductor packages. For example, the laser 202 may be in a first semiconductor package, the coherent signal generator 204 may be in a second semiconductor package, and the scanner 206 may be in a third semiconductor package. As another example, a semiconductor package may include the laser 202, the modulator 204, the coherent signal generator 206, and the scanner 208.

FIG. 2B is a block diagram depicting an example quasi-CW LIDAR system for operating of a vehicle, according to some implementations. The quasi-CW LIDAR system 200b includes the laser source 202, the coherent signal generator 206, and the scanner 208 for the optical detection of the object 210. The coherent signal generator 206 in FIG. 2B includes the features and/or functionality of the modulator 206 in FIG. 2A.

Any of the components (e.g., laser source 202, coherent signal generator 206, and scanner 208) of the quasi-CW LIDAR system 200b may be included in one or more semiconductor packages.

Figure 3:
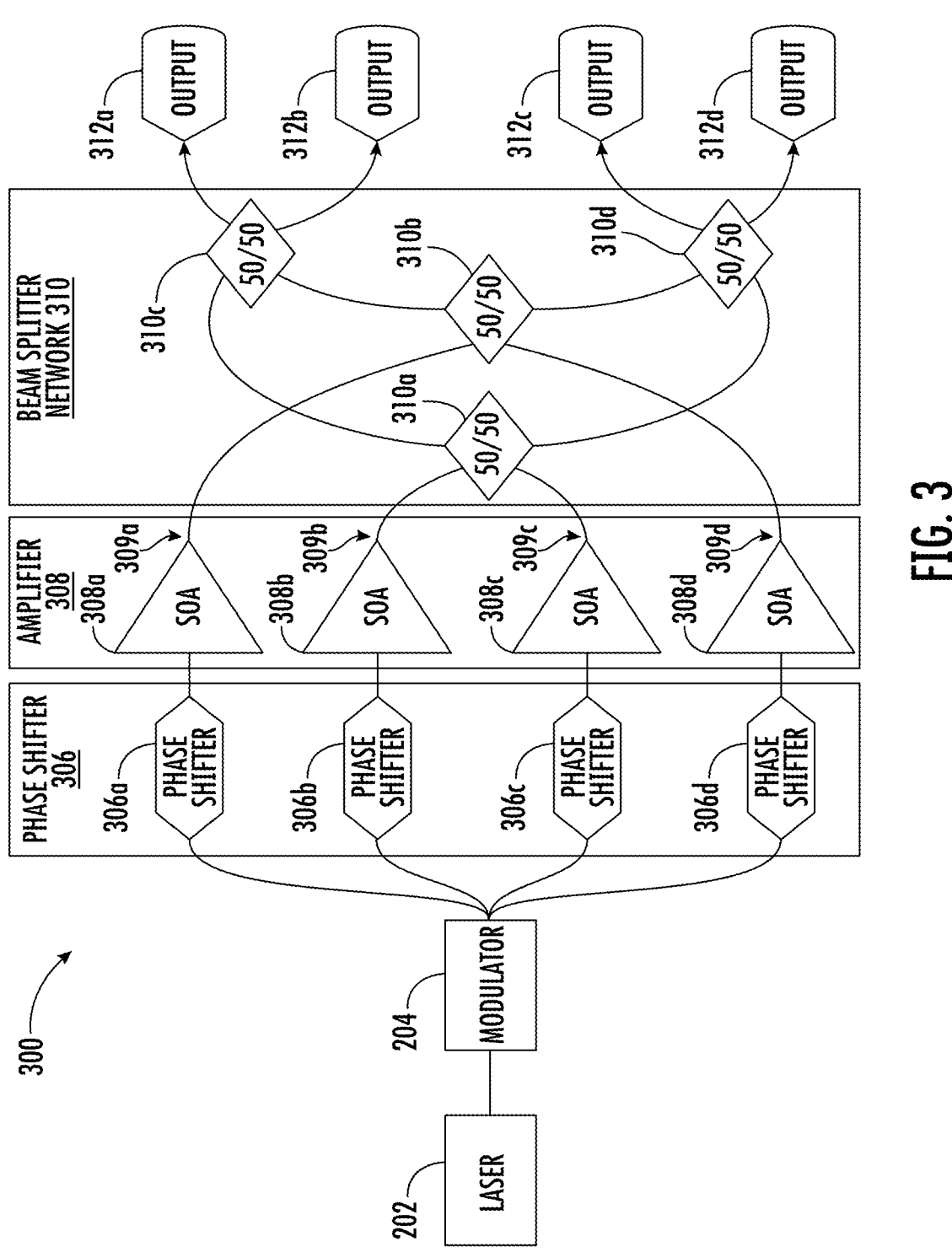
FIG. 3 is a block diagram depicting an example environment of a coherent signal generator architecture for coherent signal combining with multiple-outputs for quasi-CW LIDAR operation, according to some implementations.

FIG. 3 is a block diagram depicting an example environment of a coherent signal generator architecture (e.g., coherent signal generator 206 in FIG. 2A, coherent signal generator 206 in FIG. 2B) for coherent signal combining with multiple-outputs for quasi-CW LIDAR operation, according to some implementations. The environment 300 includes a laser source 202 for providing a light signal (sometimes referred to as, "beam"). The environment 300 includes a modulator 204 for modulating the phase and/or the frequency of the light signal using Continuous Wave (CW) modulation or quasi-CW modulation to generate a modulated signal.

The environment 300 includes a phase shifter network 306 for adjusting the phase of the modulated signal and providing the modulated signal to an amplifier 308. The phase shifter 306 contains a phase shifter 306a, a phase shifter 306b, a phase shifter 306c, and a phase shifter 306d; collectively referred to as, "phase shifters 306a-d".

The amplifier 308 includes sub-amplifiers, such as an SOA 308a, an SOA 308b, an SOA 308c, and an SOA 308d; collectively referred to as, "SOAs 308a-d". Each of the sub-amplifiers produces an amplified signal.

The environment 300 includes a beam splitter network 310 (sometimes referred to as, "splitter 310") that produces output waveforms by combining some or all of the amplified signals based on constructive and destructive interference principles. The beam splitter network 310 includes a beam splitter 310a (shown in FIG. 3 as, "50/50 310a"), a beam splitter 310b (shown in FIG. 3 as, "50/50 310b"), a beam splitter 310c (shown in FIG. 3 as, "50/50 310c"), and a beam splitter 310d (shown in FIG. 3 as, "50/50 310d"); collectively referred to as, "beam splitters 310a-d".

Figure 8:
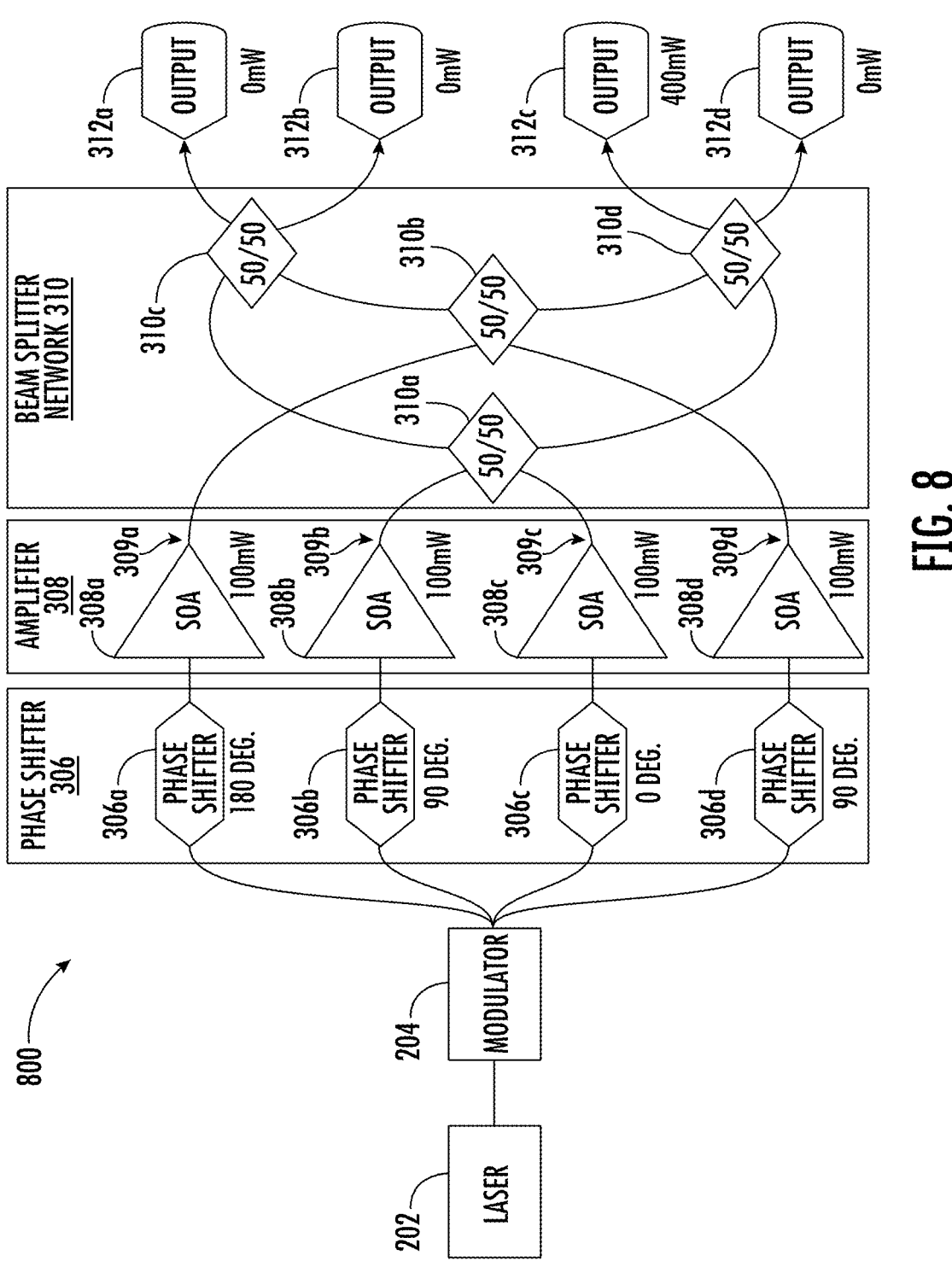
FIG. 8 is a block diagram depicting the example environment of the coherent signal generator architecture in FIG. 3 when configured to direct all the light onto an output channel, according to some implementations.

The environment 300 includes output channel 312a, output channel 312b, output channel 312c, and output channel 312d; collectively referred to as, "output channels 312a-d". Although FIG. 3 shows only a select number of components (e.g., laser source 202, modulator 204, phase shifters 306a-d, SOAs 308a-d, and beam splitters 310a-d) and output channels 312a-d; it will be appreciated by those skilled in the art that the environment 300 may include any number of components and/or output channels (in any combination) that are interconnected in any arrangement to facilitate coherent signal combining for quasi-CW LIDAR operation. For example, an 8-channel coherent signal generator architecture (e.g., as shown in FIG. 8) would include 8 phase shifters, 8 SOAs, 8 output channels, and 13 splitters. As another example, a 16-channel coherent signal generator would include 16 phase-shifters, 16 SOAs, 16 output channels, and 26 splitters.

The laser source 202 couples to an input terminal of the modulator 204, whose output couples to an input terminal of the phase shifter 306a, an input terminal of the phase shifter 306b, an input terminal of the phase shifter 306c, and an input terminal of the phase shifter 306d.

An output terminal of the phase shifter 306a couples to an input terminal of the SOA 308a, whose output terminal couples to a first input terminal of the beam splitter 310b. An output terminal of the phase shifter 306b couples to an input terminal of the SOA 308b, whose output terminal couples to a first input terminal of the beam splitter 310a. An output terminal of the phase shifter 306c couples to an input terminal of the SOA 308c, whose output terminal couples to a second input terminal of the beam splitter 310a. An output terminal of the phase shifter 306d couples to an input terminal of the SOA 308d, whose output terminal couples to a second input terminal of the beam splitter 310b.

A first output terminal of the beam splitter 310a couples to a first input terminal of the beam splitter 310c, whose first output terminal couples to an output channel 312a (shown in FIG. 3 as, "output 312a") and second output terminal couples to an output channel 312b (shown in FIG. 3 as, "output 312b").

A second output terminal of the beam splitter 310a couples to a second input terminal of the beam splitter 310d, whose first output terminal couples to an output channel 312c (shown in FIG. 3 as, "output 312c") and second output terminal couples to an output channel 312d (shown in FIG. 3 as, "output 312d").

A first output terminal of the beam splitter 310b couples to a second input terminal of the beam splitter 310c and a second output terminal of the beam splitter 310b couples to a first input terminal of the beam splitter 310d.

A semiconductor packaging (not shown in FIG. 3), in some implementations, may include some or all of the components (e.g., laser source 202, modulator 204, phase shifters 306a-d, SOAs 308a-d, and beam splitters 310a-d) of environment 300. For example, a first semiconductor packaging may include the components of the modulator 204; and a second semiconductor packaging may include the components of the phase shifter 306 (e.g., phase shifters 306a-d), the components of the amplifier 308 (e.g., SOAs 308a-d), and/or the components of the beam splitter network 310 (e.g., beam splitters 310a-d). In this arrangement, one or more outputs of the first semiconductor packaging may be coupled to the one or more inputs of the second semiconductor packaging.

As another example, a semiconductor packaging may include the components of the modulator 204, the components of the phase shifter 306 (e.g., phase shifters 306a-d), the components of the amplifier 308 (e.g., SOAs 308a-d), and/or the components of the beam splitter network 310

(e.g., beam splitters 310a-d). In this arrangement, the laser 202 may be coupled to the one or more inputs of the semiconductor packaging.

The output channels 312a-312d, in some implementations, may correspond to outputs on a semiconductor packaging.

Still referring to FIG. 3, by operating the sub-amplifiers (e.g., SOAs 308a-d) on different duty cycles, the amplifier 308 and the beam splitter network 310 may produce a continuous output waveform (e.g., output waveforms 402a-d in FIG. 4) across the output channels 312a-312d of the coherent signal generator. That is, the continuous wave power from each SOA 308a-d may be summed (based on the constructive and destructive interference principles) coherently in the beam splitter network 310 to ideally increase the output power to a single output channel at a time by N where N is the number of sub-amplifiers. This increased output power may be directed (e.g., routed, focused, etc.) at different times to different outputs providing switching to increase the effective number of available channels. The difficulty comes in the control of the phases in the beam splitter network 310 which depend on the optical path lengths of waveguides. In some implementations, some or all of the paths between the beam splitters 310a-310d may be matched. In some implementations, with good design and/or process control the number of phase shifters (e.g., phase shifters 306a-d) needed for control of the output may be reduced.

Figure 4:
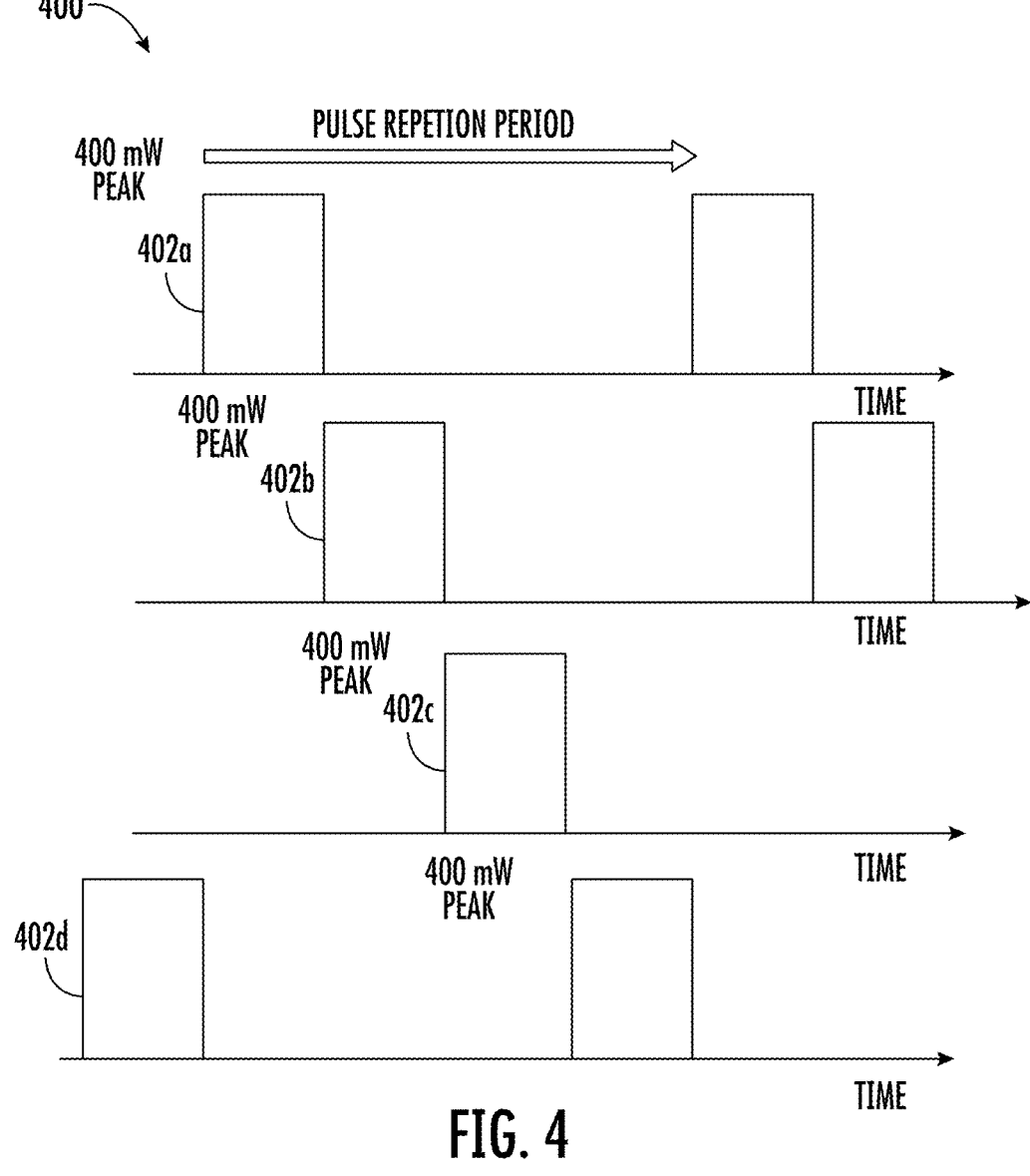
FIG. 4 is a time-based graph depicting quasi-CW waveforms as measured at the output channels 312a-312d of the coherent signal generator in FIG. 3, in accordance with an illustrative implementation.

FIG. 4 is a time-based graph depicting quasi-CW waveforms as measured at the output channels 312a-312d of the coherent signal generator in FIG. 3, in accordance with an illustrative implementation. The time-base graph includes output waveform 402a, output waveform 402b, output waveform 402c, and output waveform 402b; each of which are quasi-CW waveforms resulting from operating the components of the coherent signal generator (e.g., laser source 202, modulator 204, phase shifters 306a-d, SOAs 308a-d, and beam splitters 310a-d) under a set of operating conditions.

For example, referring to FIG. 3, the laser 202 drives the modulator with a 400 mW continuous wave (e.g., up to 95% duty cycle). The modulator 204 modulates a phase and/or a frequency of the received light signal using quasi-CW modulation to produce a modulated light signal and sends the modulated light signal to each of the input terminals of the phase shifters 306a-d. Each of the phase shifters 306a-d, as controlled by a processor (not shown in FIG. 3), shifts (e.g., adjusts, modifies, etc.) the phase of the modulated signal that it receives to produce a shifted modulated signal and sends the shifted modulated signal to the amplifier 308. The amplifier 308 amplifies each of the shifted modulated signals (four copies) that it receives from the phase shifter 306, to produce a first amplified signal that measures 100 mW at tap 309a, a second amplified signal that measures 100 mW at tap 309b, a third amplified signal that measures 100 mW at tap 309c, and a fourth amplified signal that measures 100 mW at tap 309d. The amplifier 308 sends the amplified signals (e.g., the first amplified signal, the second amplified signal, the third amplified signal, and the fourth amplified signal) to the beam splitter network 310, which produces output waveform 402a at output channel 312a, output waveform 402b at output channel 312b, output waveform 402c at output channel 312c, and output waveform 402d at output channel 312d.

The beam splitter network 310 produces each of the output waveforms 412a-412d by combining some or all of the amplified signals based on constructive and destructive interference principles.

In constructive interference, the beam splitter network 310 combines two waveforms to produce a resultant waveform having an amplitude that is higher than each of the two waveforms. For example, if the beam splitter network 310 combines two waveforms that have the same amplitude, then the resultant waveform would have a maximum amplitude that is twice the amplitude of the two waveforms. The region where the amplitude is between the original amplitude and the maximum amplitude is referred as the constructive interference. The constructive interference occurs when the waveforms are in-phase with each other.

In destructive interference, the beam splitter network 310 combines two waveforms to produce a resultant waveform having an amplitude that is lower than each of the two waveforms. For example, if the beam splitter network 310 combines two waveforms that have the same amplitude, then the resultant waveform would have a minimum amplitude that is zero. In this case, the resultant waveform would completely disappears at some places. The region between the original amplitude and the minimum amplitude is known as the region of destructive interference. Destructive interference occurs when the waveforms are out-of-phase with each other.

Figure 5:
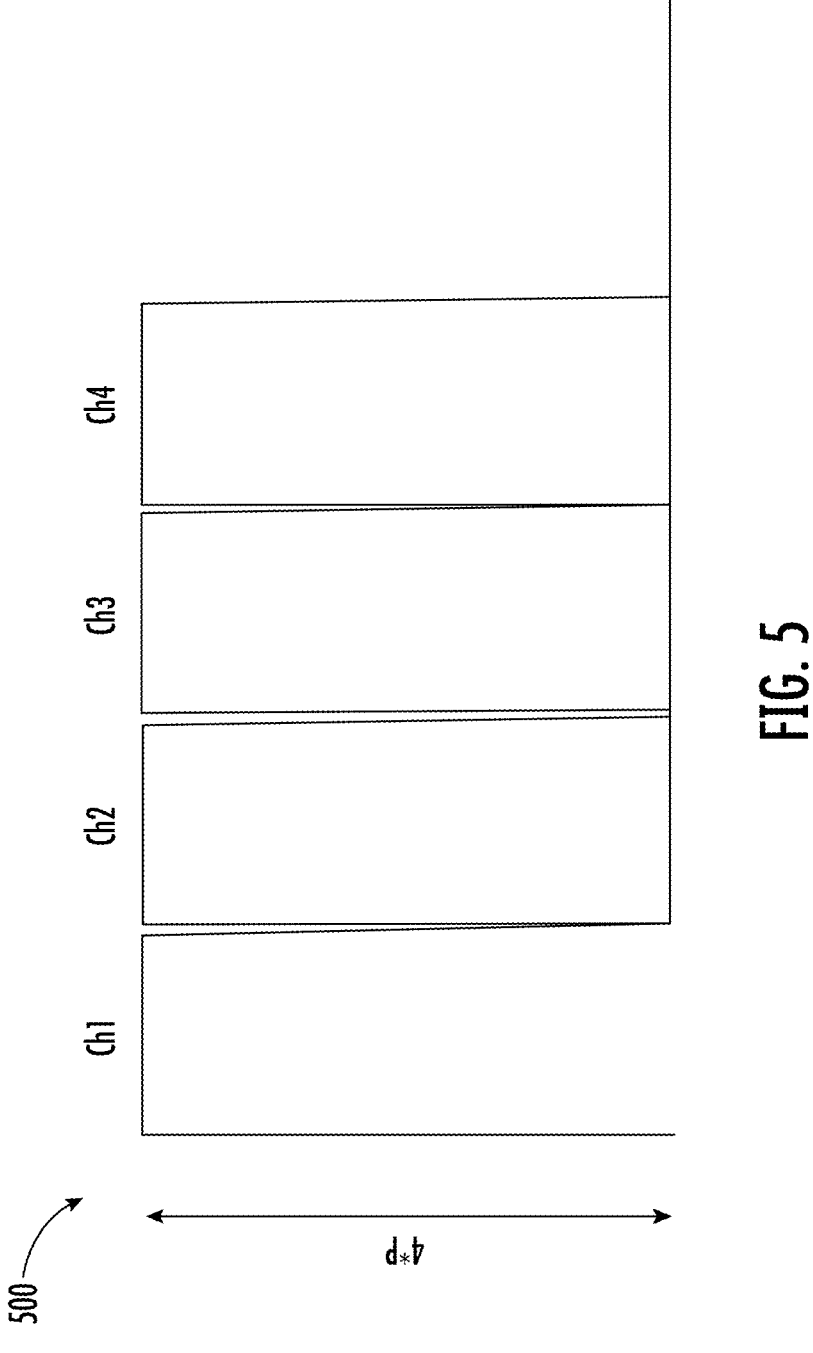
FIG. 5 is a time-based graph depicting the summation of the output powers from the SOAs 308a-308d of the coherent signal generator in FIG. 3, in accordance with an illustrative implementation.

FIG. 5 is a time-based graph depicting the summation of the output powers from the SOAs 308a-308d of the coherent signal generator in FIG. 3, in accordance with an illustrative implementation. The time-base graph 500 depicts the relationship between the output waveform 402a at the output channel 312a (shown in FIG. 5 as, "Ch1"), the output waveform 402b at the output channel 312b (shown in FIG. 5 as, "Ch2"), the output waveform 402c at the output channel 312c (shown in FIG. 5 as, "Ch3"), and the output waveform 402d at the output channel 312d (shown in FIG. 5 as, "Ch4").

With the beam splitter network 310 including beam splitters 310a-d (e.g., 50:50 2×2 splitters), it is straightforward to determine the phases of the light after the SOAs 308a-d that are needed to direct the light into a particular output channel 312a-312d. Each beam splitter 310a-d may be parameterized as a 2×2 scattering matrix according to Equation (1):

$$\vec{E}_{out} = M\vec{E}_{in}, \text{ where } M = \begin{bmatrix} i/\sqrt{2} & 0 \\ 0 & 1/\sqrt{2} \end{bmatrix} \tag{1}$$

The full network may be scaled-up. For example, the coherent signal generator (e.g., a 4×4 network) in FIG. 3 may be parameterized as two layers of 4×4 scattering matrices each of which are made up of 2×2 sub-matrices describing the 2×2 splitters in each layer. The final matrix for the 4×4 network shown in FIG. 3 may be based on Equation (2):

$$M = 1/2 \begin{bmatrix} -1 & i & 1 & i \\ i & -1 & i & 1 \\ 1 & i & -1 & i \\ i & 1 & i & -1 \end{bmatrix} \tag{2}$$

This scattering matrix may then be inverted to find the phases of the input fields that result in all the power being directed to a single output channel 312a-d, according to Equation (3):

$$\vec{E}_{in} = M^{-1}\vec{E}_{out} \tag{3}$$

If $\vec{E}_{out}[2, 0, 0, 0]^T$ is desired representing 4 times the light of one individual channel being provided out of the upper most output channel (e.g., output channel 112a). The phases, in some implementations, on the input channels are $\varphi=[0, \pi/2, \pi, \pi/2]^T$ or [0 deg., 90 deg., 180 deg., 90 deg.] as illustrated in FIG. 6.

Figure 6:
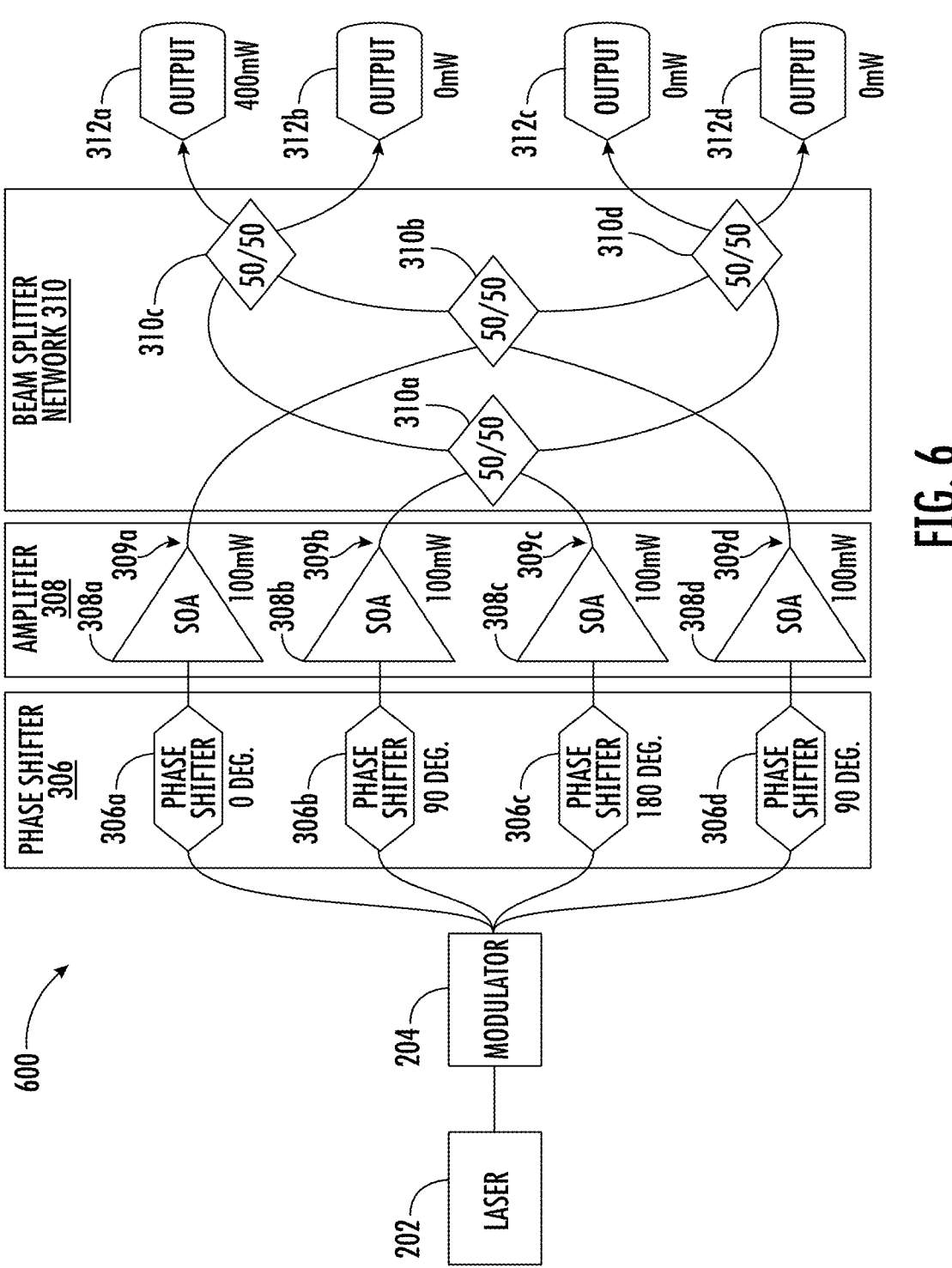
FIG. 6 is a block diagram depicting the example environment of the coherent signal generator architecture in FIG. 3 when configured to direct all the light onto an output channel, according to some implementations.

FIG. 6 is a block diagram depicting the example environment of the coherent signal generator architecture in FIG. 3 when configured to direct all the light onto an output channel, according to some implementations. The environment 600 shows the amplitude and phases for directing all of the light onto the output channel 312a, assuming all the paths from input into the beam splitter network 310 to all the output channels 312a-d have the same length. The phases are relative, so any rotation of all the phases by the same amount lead to all of the light remaining in the same output channel.

As shown in FIG. 6, the phase shifter 306a is configured to 0 degrees, the phase shifter 306b is configured to 90 degrees, the phase shifter 306c is configured to 180 degrees, the phase shifter 306d is configured to 90 degrees, the amplified signal at tap 309a is 100 mW, the amplified signal at tap 309b is 100 mW, the amplified signal at tap 309c is 100 mW, and the amplified signal at tap 309d is 100 mW. Under these conditions, the coherent signal generator produces a 400 mW waveform (100 mW+100 mW+100 mW+100 mW=400 mW) at the output channel 312a and 0 mW at output channels 312b, 312c, 312d.

Figure 7:
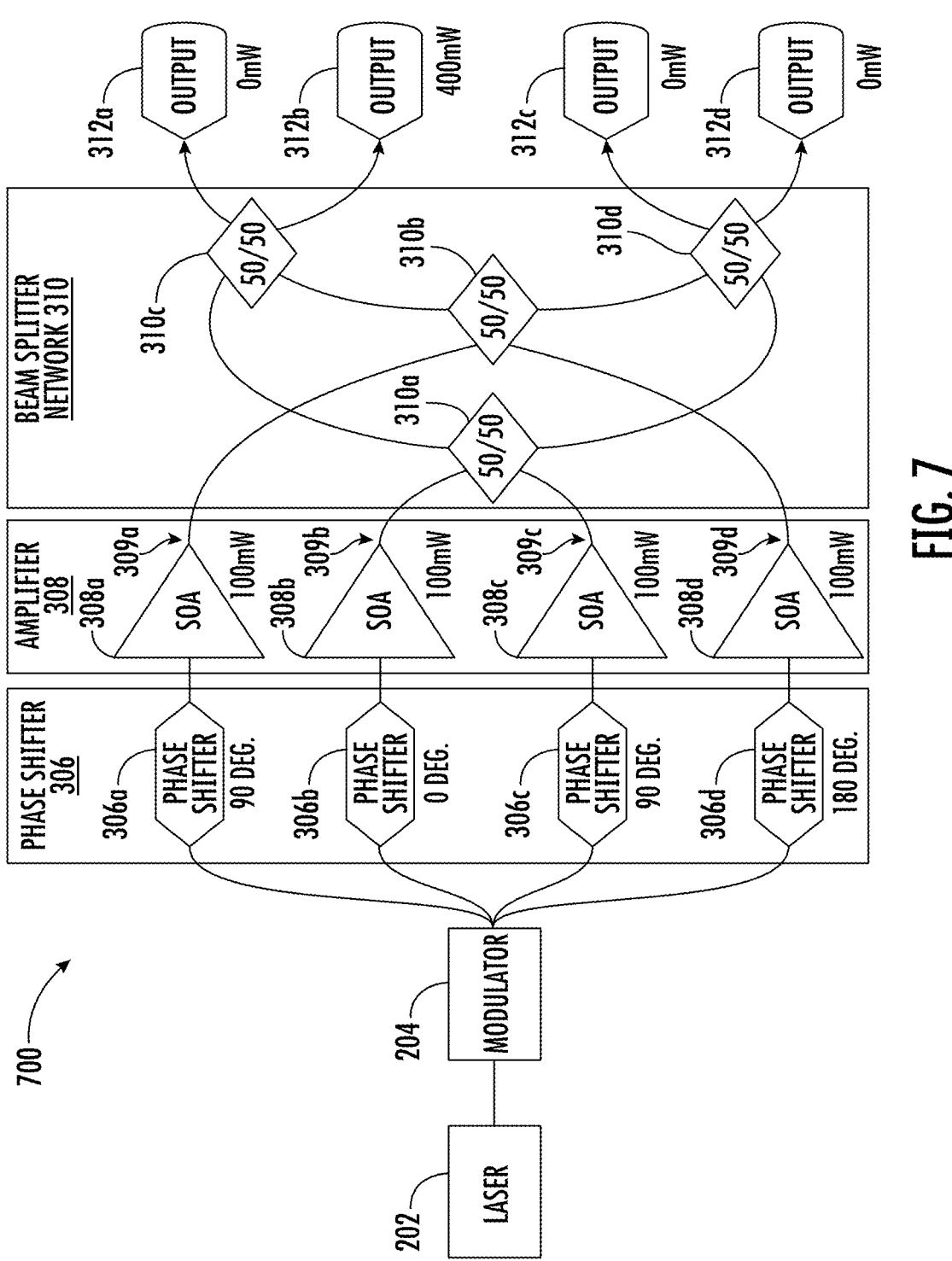
FIG. 7 is a block diagram depicting the example environment of the coherent signal generator architecture in FIG. 3 when configured to direct all the light onto an output channel, according to some implementations.

FIG. 7 is a block diagram depicting the example environment of the coherent signal generator architecture in FIG. 3 when configured to direct all the light onto an output channel, according to some implementations. The environment 700 shows the amplitude and phases for directing all of the light onto the output channel 312b, assuming all the paths from input into the beam splitter network 310 to all the output channels 312a-d have the same length. The phases are relative, so any rotation of all the phases by the same amount lead to all of the light remaining in the same output channel.

As shown in FIG. 7, the phase shifter 306a is configured to 90 degrees, the phase shifter 306b is configured to 0 degrees, the phase shifter 306c is configured to 90 degrees, the phase shifter 306d is configured to 180 degrees, the amplified signal at tap 309a is 100 mW, the amplified signal at tap 309b is 100 mW, the amplified signal at tap 309c is 100 mW, and the amplified signal at tap 309d is 100 mW. Under these conditions, the coherent signal generator produces a 400 mW waveform (100 mW+100 mW+100 mW+100 mW=400 mW) at the output channel 312b and 0 mW at output channels 112a, 112c, 112d.

FIG. 8 is a block diagram depicting the example environment of the coherent signal generator architecture in FIG. 3 when configured to direct all the light onto an output channel, according to some implementations. The environment 800 shows the amplitude and phases for directing all of the light onto the output channel 312c, assuming all the paths from input into the beam splitter network 310 to all the output channels 312a-d have the same length. The phases are relative, so any rotation of all the phases by the same amount lead to all of the light remaining in the same output channel.

As shown in FIG. 8, the phase shifter 306a is configured to 180 degrees, the phase shifter 306b is configured to 90 degrees, the phase shifter 306c is configured to 0 degrees, the phase shifter 306d is configured to 90 degrees, the amplified signal at tap 309a is 100 mW, the amplified signal at tap 309b is 100 mW, the amplified signal at tap 309c is 100 mW, and the amplified signal at tap 309d is 100 mW. Under these conditions, the coherent signal generator produces a 400 mW waveform (100 mW+100 mW+100 mW+100 mW=400 mW) at the output channel 312c and 0 mW at output channels 312a, 312b, 312d.

Figure 9:
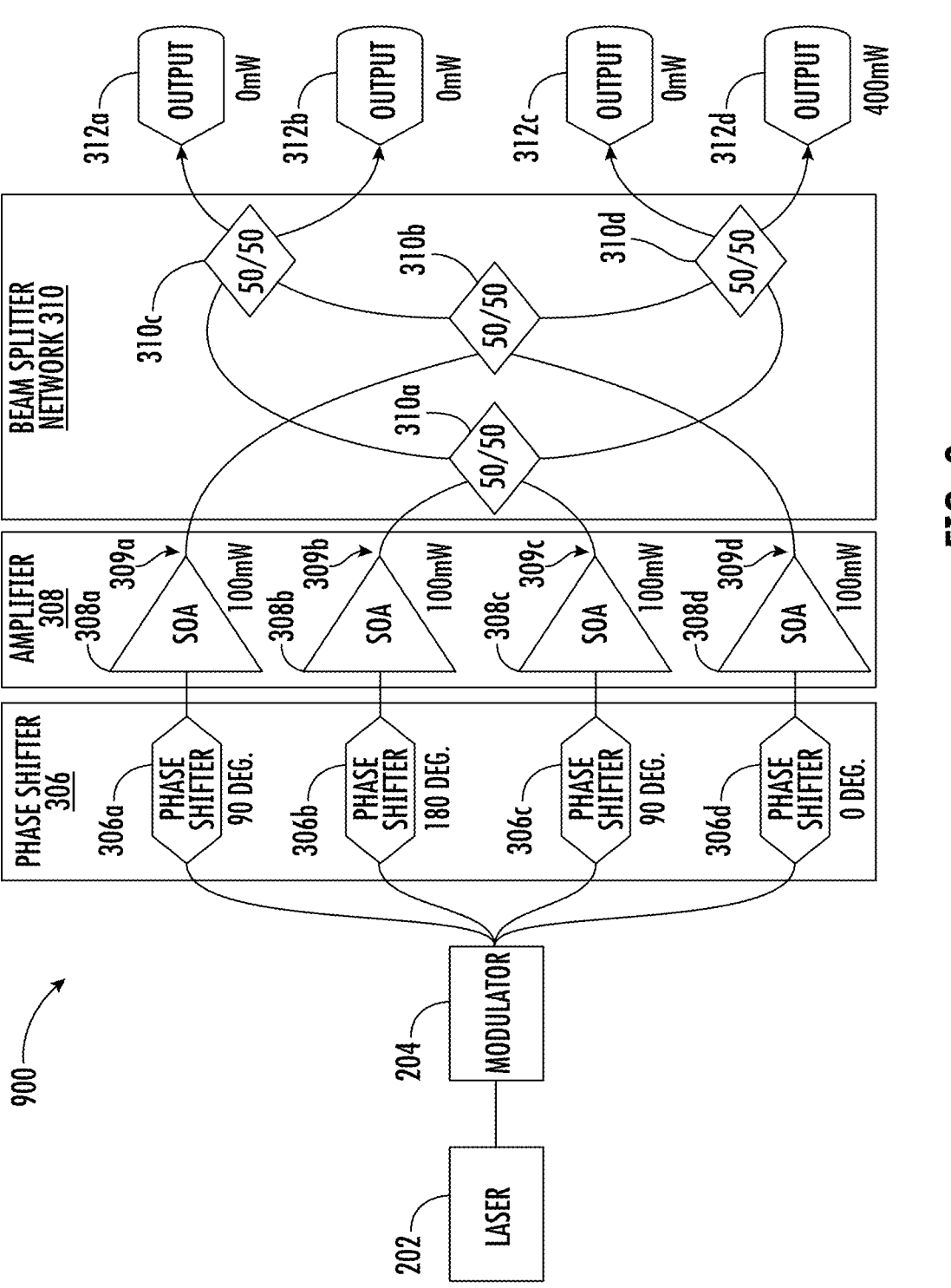
FIG. 9 is a block diagram depicting the example environment of the coherent signal generator architecture in FIG. 3 when configured to direct all the light onto an output channel, according to some implementations.

FIG. 9 is a block diagram depicting the example environment of the coherent signal generator architecture in FIG. 3 when configured to direct all the light onto an output channel, according to some implementations. The environment 900 shows the amplitude and phases for directing all of the light onto the output channel 312d, assuming all the paths from input into the beam splitter network 310 to all the output channels 312a-d have the same length. The phases are relative, so any rotation of all the phases by the same amount lead to all of the light remaining in the same output channel.

As shown in FIG. 9, the phase shifter 306a is configured to 90 degrees, the phase shifter 306b is configured to 180 degrees, the phase shifter 306c is configured to 90 degrees, the phase shifter 306d is configured to 0 degrees, the amplified signal at tap 309a is 100 mW, the amplified signal at tap 309b is 100 mW, the amplified signal at tap 309c is 100 mW, and the amplified signal at tap 309d is 100 mW. Under these conditions, the coherent signal generator produces a 400 mW waveform (100 mW+100 mW+100 mW+100 mW=400 mW) at the output channel 312d and 0 mW at output channels 312a, 312b, 312c.

Figure 10:
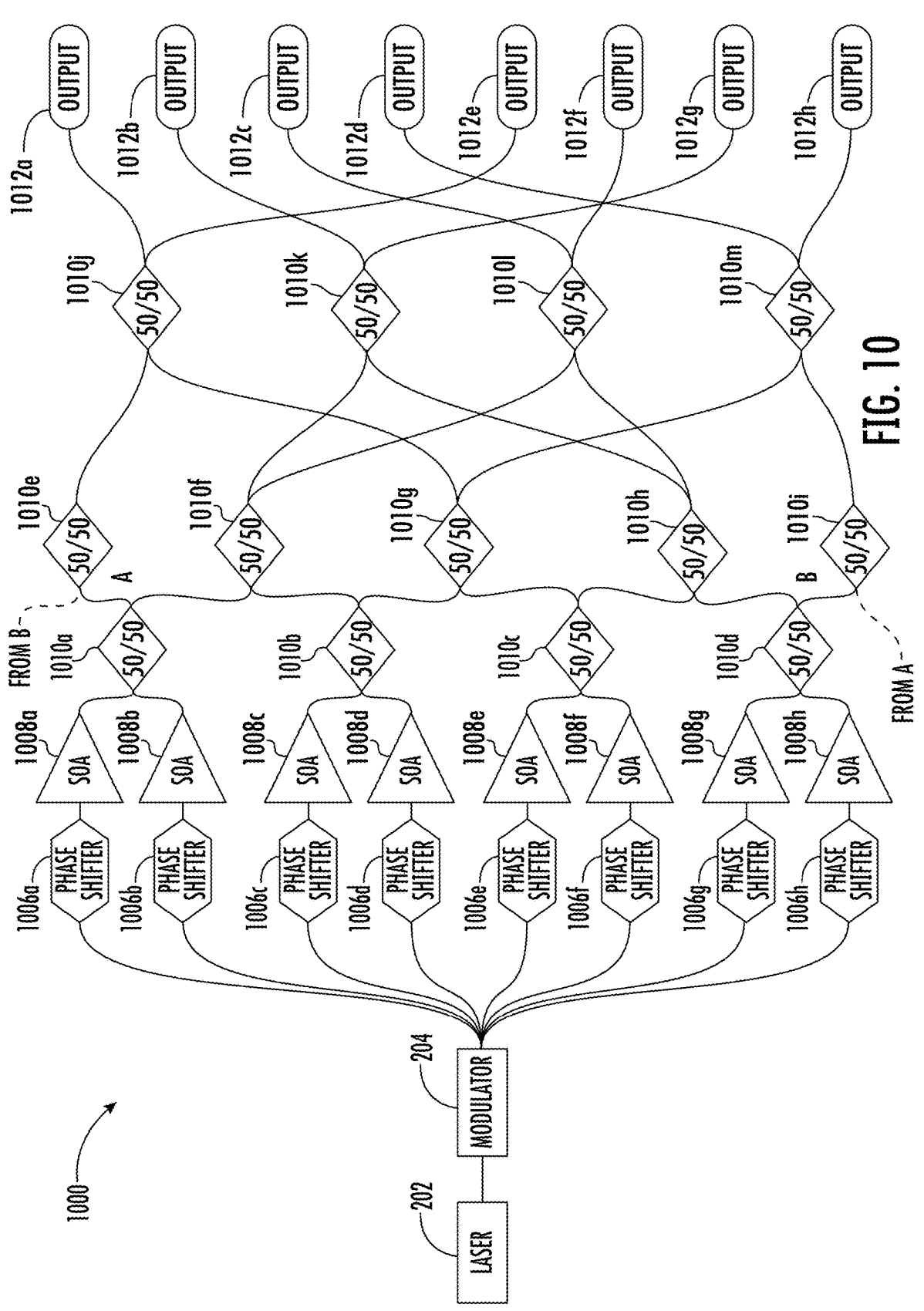
FIG. 10 is a block diagram depicting an example environment of a coherent signal generator architecture for coherent signal combining with multiple-outputs for quasi-CW LIDAR operation, according to some implementations.

FIG. 10 is a block diagram depicting an example environment of a coherent signal generator architecture for coherent signal combining with multiple-outputs for quasi-CW LIDAR operation, according to some implementations. The environment 1000 includes a laser source 202 for providing a light signal. The environment 1000 includes a modulator 204 for modulating a phase and/or a frequency of the light signal using Continuous Wave (CW) modulation or quasi-CW modulation to generate a modulated signal.

The environment 1000 includes a phase shifter network for adjusting the phase of the modulated signal and providing the modulated signal to an amplifier 1008. The phase shifter 1006 contains a phase shifter 1006a, a phase shifter 1006b, a phase shifter 1006c, a phase shifter 1006d, a phase shifter 1006e, a phase shifter 1006f, a phase shifter 1006g, and a phase shifter 1006h; collectively referred to as, "phase shifters 1006a-h".

The amplifier 1008 includes sub-amplifiers, such as an SOA 1008a, an SOA 1008b, an SOA 1008c, an SOA 1008d, an SOA 1008c, an SOA 1008f, an SOA 1008g, and an SOA 1008h; collectively referred to as, "SOAs 1008a-h". Each of the sub-amplifiers produces an amplified signal.

The environment 1000 includes a beam splitter network 1010 that produces output waveforms by combining some or all of the amplified signals based on constructive and destructive interference principles. The beam splitter network 1010 includes a beam splitter 1010a (shown in FIG. 10 as, "50/50 1010a"), a beam splitter 1010b (shown in FIG. 10 as, "50/50 1010b"), a beam splitter 1010c (shown in FIG. 10 as, "50/50 1010c"), a beam splitter 1010d (shown in FIG. 10 as, "50/50 1010d"), a beam splitter 1010e (shown in FIG. 10 as, "50/50 1010e"), a beam splitter 1010f (shown in FIG. 10 as, "50/50 1010f"), a beam splitter 1010g (shown in FIG. 10 as, "50/50 1010g"), a beam splitter 1010h (shown in FIG. 10 as, "50/50 1010h"), a beam splitter 1010i (shown in FIG. 10 as, "50/50 1010i"), a beam splitter 1010j (shown in FIG. 10 as, "50/50 1010j"), a beam splitter 1010k (shown in FIG. 10 as, "50/50 1010k"), a beam splitter 10101 (shown in FIG. 10 as, "50/50 10101"), and a beam splitter 1010m (shown in FIG. 10 as, "50/50 1010m"); collectively referred to as, "beam splitters 1010a-m".

The environment 1000 includes output channel 1012a, output channel 1012b, output channel 1012c, output channel 1012d, output channel 1012e, output channel 1012f, output channel 1012g, and output channel 1012h; collectively referred to as, "output channels 1012a-h". Although FIG. 10 shows only a select number of components (e.g., laser source 202, modulator 204, phase shifters 1006a-h, SOAs 1008a-h, and beam splitters 1010a-m) and output channels 1012a-h; it will be appreciated by those skilled in the art that the environment 1000 may include any number of components and/or output channels (in any combination) that are interconnected in any arrangement to facilitate coherent signal combining for quasi-CW LIDAR operation.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10 (e.g., 1 to 4).

Some implementations of the present disclosure are described below in the context of one or more hi-res Doppler LIDAR systems that are mounted onto an area (e.g., front, back, side, top, and/or bottom) of a personal automobile; but, implementations are not limited to this context. In other implementations, one or multiple systems of the same type or other high resolution LIDAR, with or without Doppler components, with overlapping or non-overlapping fields of view or one or more such systems mounted on smaller or larger land, sea or air vehicles, piloted or autonomous, are employed. In other implementations, the scanning hi-res LIDAR is mounted at temporary or permanent fixed positions on land or sea.

What is claimed is:

1. A light detection and ranging (LIDAR) system comprising:

a laser configured to output a beam;

an amplifier configured to generate, based on the beam, a plurality of amplified optical signals that are respectively associated with a plurality of phases, and a plurality of splitters coupled between the amplifier and a plurality of outputs and configured to:

receive the plurality of amplified optical signals, and generate, at a first point of time, a first combined optical signal of the plurality of amplified optical signals at a first output of the plurality of outputs with no optical signal at remaining outputs except the first output of the plurality of outputs, and generate, at a second point of time, a second combined optical signal of the plurality of amplified optical signals at a second output of the plurality of outputs with no optical signal at remaining outputs except the second output of the plurality of outputs.

2. The LIDAR system of claim 1, wherein an amplitude of the first combined optical signal and an amplitude of the second combined optical signal corresponds to a combined amplitude of the plurality of amplified optical signals.

3. The LIDAR system of claim 1, wherein the amplifier comprises a plurality of sub-amplifiers that are respectively configured to receive a plurality of optical signals.

4. The LIDAR system of claim 3, wherein the plurality of splitters are respectively coupled to a respective one of the plurality of sub-amplifiers, wherein the plurality of splitters are respectively configured to:

receive a respective one of the plurality of amplified optical signals.

5. The LIDAR system of claim 3, wherein a quantity of the plurality of outputs corresponds to a count of the plurality of sub-amplifiers.

6. The LIDAR system of claim 5, wherein the plurality of optical signals respectively corresponds to a quasi-continuous wave signal.

7. The LIDAR system of claim 1, wherein a quantity of the plurality of amplified optical signals is greater than or equal to four.

8. An autonomous vehicle control system comprising one or more processors, wherein the one or more processors are configured to:

cause a laser to output a beam;

cause an amplifier to generate, based on the beam, a plurality of amplified optical signals that are respectively associated with a plurality of phases;

cause a plurality of splitters to:

receive the plurality of amplified optical signals wherein the plurality of splitters are coupled between the amplifier and a plurality of outputs, generate, at a first point of time, a first combined optical signal of the plurality of amplified optical signals at a first output of the plurality of outputs with no optical signal at remaining outputs except the first output of the plurality of outputs, generate, at a second point of time, a second combined optical signal of the plurality of amplified optical signals at a second output of the plurality of outputs with no optical signal at remaining outputs except the second output of the plurality of outputs, and operate a vehicle based on the second combined optical signal.

9. The autonomous vehicle control system of claim 8, wherein an amplitude of the first combined optical signal and an amplitude of the second combined optical signal corresponds to a combined amplitude of the plurality of amplified optical signals.

10. The autonomous vehicle control system of claim 8, wherein the amplifier comprises a plurality of sub-amplifiers, wherein the one or more processors are configured to cause each of the plurality of sub-amplifiers to receive a respective one of a plurality of optical signals.

11. The autonomous vehicle control system of claim 10, wherein the plurality of splitters are respectively coupled to a respective one of the plurality of sub-amplifiers, wherein the one or more processors are configured to cause each of the plurality of splitters to receive a respective one of the plurality of amplified optical signals.

12. The autonomous vehicle control system of claim 10, wherein a count of the plurality of outputs corresponds to a count of the plurality of sub-amplifiers.

13. The autonomous vehicle control system of claim 12, wherein the plurality of optical signals respectively corresponds to a quasi-continuous wave signal.

14. The autonomous vehicle control system of claim 8, wherein a quantity of the plurality of amplified optical signals is greater than or equal to four.

15. An autonomous vehicle, comprising:

a light detection and ranging (LIDAR) system comprising:

a laser configured to output a beam;

an amplifier configured to generate, based on the beam, a plurality of amplified optical signals that are respectively associated with a plurality of phases; and a plurality of splitters coupled between the amplifier and a plurality of outputs and configured to:

receive the plurality of amplified optical signals, generate, at a first point of time, a first combined optical signal of the plurality of outputs at a first output of the plurality of outputs with no optical signal at remaining outputs except the first output of the plurality of outputs, and generate, at a second point of time, a second combined optical signal of the plurality of outputs at a second output of the plurality of outputs with no optical signal at remaining outputs except the second output of the plurality of outputs;

at least one of a steering system or a braking system; and a vehicle controller comprising one or more processors configured to control operation of the at least one of the steering system or the braking system based on the second combined optical signal.

16. The autonomous vehicle of claim 15, wherein an amplitude of the first combined optical signal and an amplitude of the second combined optical signal corresponds to a combined amplitude of the plurality of amplified optical signals.

17. The autonomous vehicle of claim 15, wherein the amplifier comprises a plurality of sub-amplifiers, wherein the one or more processors are configured to cause each of the plurality of sub-amplifiers to receive a respective one of a plurality of optical signals.

18. The autonomous vehicle of claim 17, wherein the plurality of splitters that are respectively coupled to a respective one of the plurality of sub-amplifiers, wherein the one or more processors are configured to cause each of the plurality of splitters to receive a respective one of the plurality of amplified optical signals.

19. The autonomous vehicle of claim 17, wherein a quantity of the plurality of outputs corresponds to a count of the plurality of sub-amplifiers.

20. The autonomous vehicle of claim 19, wherein the plurality of optical signals respectively corresponds to a quasi-continuous wave signal.

\* \* \* \* \*